United States Patent
Young et al.

(10) Patent No.: US 10,164,843 B2
(45) Date of Patent: Dec. 25, 2018

(54) NETWORK SWITCH, DEVICE MANAGEMENT SYSTEM, AND DEVICE MANAGEMENT METHOD THEREOF

(71) Applicant: Ruby Tech Corporation, Taipei (TW)

(72) Inventors: Yu-Che Young, Taipei (TW); Li-Te Chang, Taipei (TW); Chin-Piao Hung, Taipei (TW)

(73) Assignee: Ruby Tech Corporation, Taipei (TW)

( * ) Notice: Subject to any disclaimer, the term of this patent is extended or adjusted under 35 U.S.C. 154(b) by 192 days.

(21) Appl. No.: 14/958,875

(22) Filed: Dec. 3, 2015

(65) Prior Publication Data

US 2017/0085434 A1 Mar. 23, 2017

Related U.S. Application Data

(60) Provisional application No. 62/221,112, filed on Sep. 21, 2015.

(30) Foreign Application Priority Data

Oct. 15, 2015 (TW) .............................. 104133845 A

(51) Int. Cl.
   *G06F 15/16* (2006.01)
   *H04L 12/24* (2006.01)
   *H04L 29/06* (2006.01)

(52) U.S. Cl.
   CPC ............. *H04L 41/22* (2013.01); *H04L 29/06* (2013.01); *H04L 41/0677* (2013.01); *H04L 41/0803* (2013.01); *H04L 41/12* (2013.01)

(58) Field of Classification Search
   CPC ... H04L 29/08072; H04L 29/06; H04W 40/36
   (Continued)

(56) References Cited

U.S. PATENT DOCUMENTS 6,507,273 B1   1/2003 Chang et al.
7,706,300 B2 *  4/2010 Norrgard ............ H04L 41/0213
                                              370/254
(Continued)

FOREIGN PATENT DOCUMENTS

CN   101008892    8/2007
CN   104158747   11/2014
(Continued)

OTHER PUBLICATIONS

"Office Action of Taiwan Counterpart Application," dated Dec. 19, 2016, p. 1-p. 8.
(Continued)

*Primary Examiner* — Khanh Q Dinh
(74) *Attorney, Agent, or Firm* — JCIPRNET

(57) ABSTRACT

A network switch, a device management system, and a device management method thereof are provided. A network management system with a graphical management interface is embedded in the network switch, so that network administrators can use web browser for management. The graphical management interface provides a topology mode, a floor mode and a map mode for the network administrators to intuitively manage Internet Protocol (IP) connected apparatuses on a topological diagram, a floor plan or a map. Furthermore, in response to a control operation corresponding to the IP connected apparatus on the graphical management interface, the network switch performs a device function operation (e.g., an information collecting operation, a configuration setting operation, a node searching operation, a system login operation, etc.) corresponding to the control operation through a communication module thereof. Accordingly, an innovative and convenient device management system can be provided for the network administrators.

11 Claims, 7 Drawing Sheets

(58) Field of Classification Search
USPC .................. 709/220, 224, 228, 232; 370/254
See application file for complete search history.

(56) References Cited

U.S. PATENT DOCUMENTS

| | | | |
|---|---|---|---|
| 8,005,793 B1* | 8/2011 | Jernigan, IV | G06F 3/0617 707/639 |
| 8,787,154 B1* | 7/2014 | Medved | H04L 45/64 370/225 |
| 9,143,557 B2* | 9/2015 | Guichard | H04L 67/16 |
| 9,258,762 B2* | 2/2016 | Bosch | H04W 40/36 |
| 2005/0105475 A1* | 5/2005 | Norrgard | H04L 41/0213 370/254 |
| 2008/0133718 A1* | 6/2008 | Bouchat | H04L 41/0806 709/220 |
| 2013/0201909 A1* | 8/2013 | Bosch | H04W 40/36 370/328 |
| 2014/0003232 A1* | 1/2014 | Guichard | H04L 67/16 370/230 |
| 2014/0280809 A1 | 9/2014 | Li et al. | |
| 2015/0193862 A1* | 7/2015 | Luft | G06Q 30/0641 705/27.1 |
| 2016/0283259 A1* | 9/2016 | Mehta | G06F 9/45558 |

FOREIGN PATENT DOCUMENTS

| | | |
|---|---|---|
| JP | H06282527 | 10/1994 |
| JP | 2003289313 | 10/2003 |
| JP | 2005057350 | 3/2005 |
| TW | 201516708 | 5/2015 |
| WO | 2014116964 | 7/2014 |

OTHER PUBLICATIONS

Cisco Systems,"Secure Network Foundation Implementation Guide for Single Site Deployments",the manual of the Secure network foundation implementation Guide for Single Site Deployments, Jan. 1, 2016, pp. 1-26.

"Search Report of European Counterpart Application," dated Dec. 22, 2016, p. 1-p. 7.

"Office Action of Japan Counterpart Application," dated Nov. 7, 2017, p. 1-p. 3.

\* cited by examiner

NETWORK SWITCH, DEVICE MANAGEMENT SYSTEM, AND DEVICE MANAGEMENT METHOD THEREOF

CROSS-REFERENCE TO RELATED APPLICATION

This application claims the priority benefits of U.S. provisional application Ser. No. 62/221,112, filed on Sep. 21, 2015 and Taiwan application serial no. 104133845, filed on Oct. 15, 2015. The entirety of each of the above-mentioned patent applications is hereby incorporated by reference herein and made a part of this specification.

BACKGROUND OF THE INVENTION

Field of the Invention

The invention relates to a network management method, and more particularly, to a network switch, a device management system and a device management method thereof.

Description of Related Art

With rapid development in information technology, various electronic devices have been popularized day by day. In order to achieve the objective of resource sharing, network becomes the standard equipment for information exchange, and induces dramatic increases in growth of commercial and home IP connected apparatuses (e.g., smart phones, smart cameras, wireless routers, smart televisions, etc.). Among them, a network switch has become the key equipment in network information exchange due to features like rapid information exchange.

On the other hand, with dramatic increases in growth of commercial and home IP connected apparatuses, in addition to difficulties in a centralized management, it is also hard for the network administrators to know of problems occurred on the equipments immediately. Further, the conventional network switch may provide a network configuration setting to control the IP connected apparatuses connected thereto. However, the conventional network switch can only provide Command-Line Interface (CLI) and Webpage User Interface (Web UI), so it requires not only the professional personnel in the network related art for the setting but also requires complex operations in order to complete the setting for all the IP connected apparatuses in the environment. Aside from the network configuration setting, the conventional CLI and Web UI can also cause a lot of problems for the general public or even the network administrators in terms of performance management and troubleshooting issues.

SUMMARY OF THE INVENTION

The invention is directed to a network switch, a device management system and a device management method thereof, which let a graphical network management system (NMS) and a device management system (DMS) be embedded in the network switch, so as to allow the network administrators or even the general public to operate IP connected apparatuses more conveniently.

The invention provides a network switch, which includes a communication module, a storage unit and a processing unit. The communication module is configured to transmit and receive signals. The storage unit is configured to store a plurality of modules. The processing unit is coupled to the communication module and the storage unit to access and execute the modules recorded in the storage unit. The modules include a device management module and a management interface module. The device management module performs a device management operation through the communication module. The management interface module provides a graphical management interface. In response to a control operation on the graphical management interface, the device management module performs the device function operation corresponding to the control operation.

In an embodiment of the invention, the device management module generates a control signal corresponding to the control operation based on a network protocol, and transmits the control signal through a corresponding connection port in the communication module to perform the device function operation. The control operation is corresponding to an IP connected apparatus or another network switch.

In an embodiment of the invention, the device function operation includes one of an information collecting operation and a configuration setting operation or a combination thereof. The device management module performs the information collecting operation or the configuration setting operation on the IP connected apparatus through the communication module to obtain related information of the IP connected apparatus or set the IP connected apparatus corresponding to the control operation. Further, the management interface module presents the related information of the IP connected apparatus through the graphical management interface.

In an embodiment of the invention, the graphical management interface provides one of a topology mode, a floor mode and a map mode or a combination thereof. In response to the control operation, the management interface module presents the related information of the IP connected apparatus through one of said modes.

In an embodiment of the invention, the related information of the IP connected apparatus includes network address information. The device management module executes a script program based on the network address information, and performs the information collecting operation or the configuration setting operation through the script program.

In an embodiment of the invention, the device function operation includes a node searching operation. The device management module performs the node searching operation based on the IP connected apparatus corresponding to the control operation to generate the control signal including a warning control instruction. The warning control instruction is configured to control the IP connected apparatus to perform a warning behavior.

In an embodiment of the invention, the device function operation includes a system login operation. The device management module performs the system login operation to log in the IP connected apparatus through the communication module and performs a proxy operation on a management system of the IP connected apparatus.

In an embodiment of the invention, the modules further include a file access module. The file access module is configured to allow the IP connected apparatus to access files in the storage unit through the communication module.

The invention also provides a device management method, which is adapted to a network switch having a communication module. The network switch is directly or indirectly coupled to an IP connected apparatus. The device management method includes the following steps. A graphical management interface is provided. In response to a control operation on the graphical management interface, the device function operation corresponding to the control operation is performed through the communication module.

The control operation is corresponding to the IP connected apparatus or another network switch.

In an embodiment of the invention, the step of performing the device function operation corresponding to the control operation through the communication module includes the following steps. A control signal corresponding to the control operation is generated based on a network protocol, and the control signal is transmitted through a corresponding connection port in the communication module to perform the device function operation.

In an embodiment of the invention, the device function operation includes one of an information collecting operation and a configuration setting operation or a combination thereof, and the step of performing the device function operation corresponding to the control operation through the communication module includes the following steps. The information collecting operation or the configuration setting operation is performed on the IP connected apparatus through the communication module to obtain related information of the IP connected apparatus or set the IP connected apparatus corresponding to the control operation. The related information of the IP connected apparatus is present through the graphical management interface.

In an embodiment of the invention, the graphical management interface provides one of a topology mode, a floor mode and a map mode or a combination thereof, and the step of performing the device function operation corresponding to the control operation through the communication module includes the following steps. In response to the control operation, the related information of the IP connected apparatus is presented through one of said modes.

In an embodiment of the invention, the related information of the IP connected apparatus includes network address information, and the step of performing the device function operation corresponding to the control operation through the communication module includes the following steps. A script program is executed based on the network address information. The information collecting operation or the configuration setting operation is performed through the script program.

In an embodiment of the invention, the device function operation includes a node searching operation, and the step of performing the device function operation corresponding to the control operation through the communication module includes the following steps. The node searching operation is performed based on the IP connected apparatus corresponding to the control operation to generate the control signal including a warning control instruction. In response to the warning control instruction being received, a warning behavior is performed by the IP connected apparatus.

In an embodiment of the invention, the device function operation includes a system login operation, and the step of performing the device function operation corresponding to the control operation through the communication module includes the following steps. The system login operation is performed to log in one IP connected apparatus through the communication module. A proxy operation on a management system of the IP connected apparatus is then performed.

In an embodiment of the invention, the network switch includes a storage unit, and the device management method further includes the following steps. The IP connected apparatus is allowed to access files in the storage unit through the communication module.

The invention further provides a device management system, which includes IP connected apparatuses and network switches. The network switch is directly or indirectly coupled to the IP connected apparatus. Each of the IP connected apparatuses provides a graphical management interface. In response to a control operation on the graphical management interface, each of the network switches performs the device function operation corresponding to the control operation. The control operation is corresponding to the IP connected apparatus or another network switch.

In summary, the network switch, the device management system and the device management method thereof proposed according to the embodiments of the invention provides the embedded graphical management interface, so that the network administrators can perform the operations more conveniently. In addition, the network switch detects the configuration setting or the control operation for the IP connected apparatuses on the graphical management interface, so as to perform various device function operations for the selected IP connected apparatus or another network switch.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
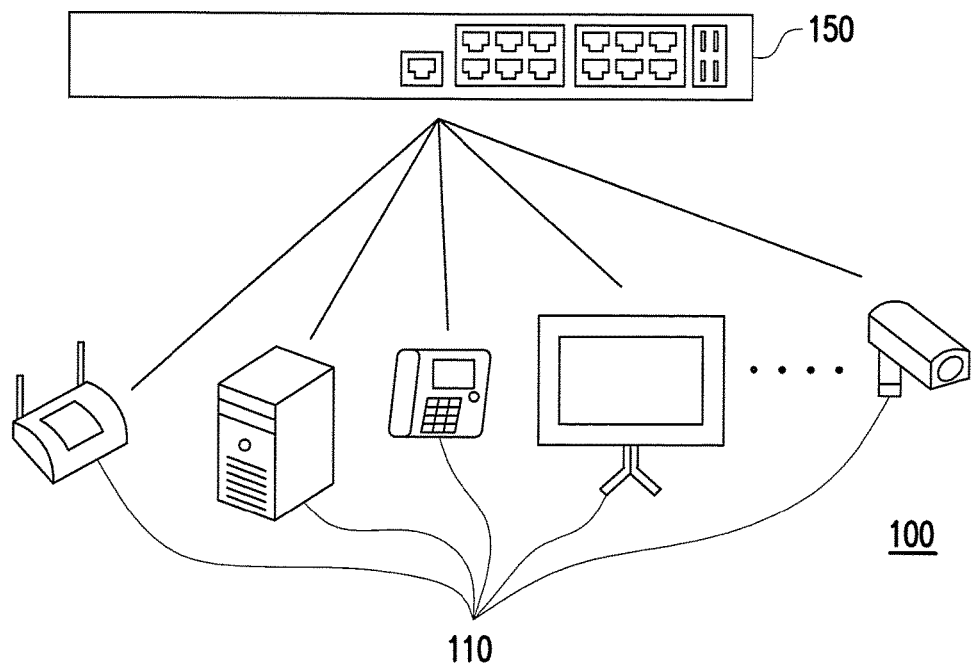
FIG. 1 is a schematic diagram illustrating a device management system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram illustrating a device management system according to an embodiment of the invention. Referring to FIG. 1, a device management system 100 includes one or more IP connected apparatuses 110 and one or more network switches 150. It should be noted that, amounts of the IP connected apparatuses 110 and the network switches 150 are not limited by those illustrated in FIG. 1, but may be changed by the persons applying the embodiments of the invention.

The IP connected apparatus 110 may be an electronic apparatus, such as a computer, a wireless router, a server, a smart phone, a display apparatus, a smart camera, a router, a network switch and the like, which is capable of performing data transmission with another IP connected apparatus 110 and the network switch 150 or connecting to the Internet based on at least one network protocol (e.g., Internet Protocol (IP), Transmission Control Protocol (TCP), User Datagram Protocol (UDP), etc.).

Figure 2:
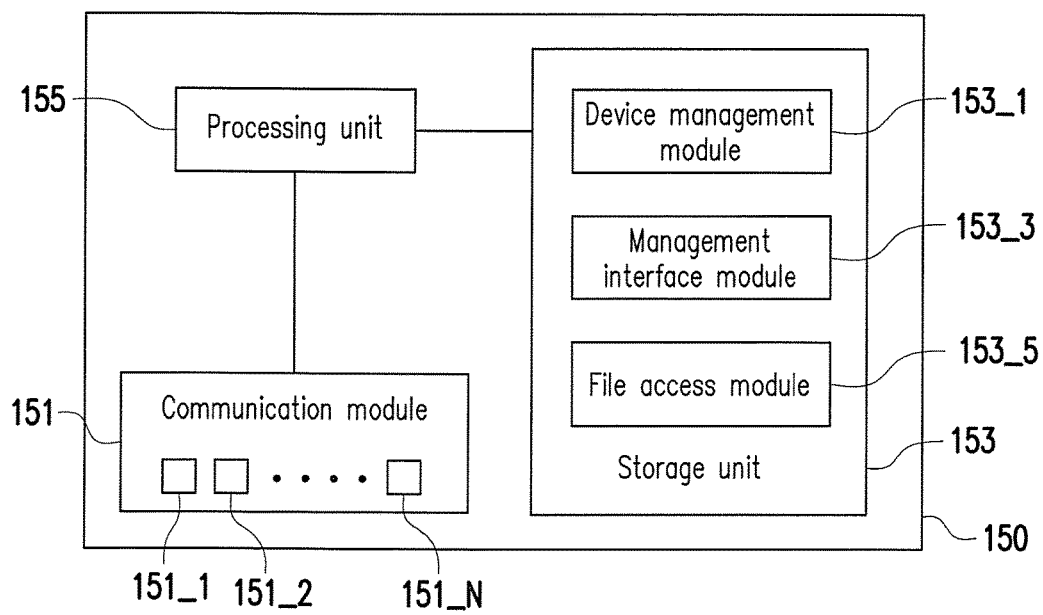
FIG. 2 is a block diagram of a network switch.

Next, referring to FIG. 2 which is a block diagram illustrating elements of the network switch 150, the network switch 150 at least includes a communication module 151, a storage unit 153 and a processing unit 155. The communication module 151 at least supports IEEE 802.3/ab/u/x/z Ethernet standard, and includes one or more connection ports 151_1 to 151N, where N is a positive integer. Each of the connection ports 151_1 to 151_N can support interfaces including RJ45 or an optical fiber (e.g., Small Form-factor Pluggable (SFP)) with transmission speed of 10 or 100 Mbps and/or 1 or 10 Gbps. The IP connected apparatuses 110 can be directly or indirectly connected to the network switch 150 through the connection ports 151_1 to 151_N, respectively. It should be noted that, the communication module 151 may also support IEEE 802.1Q/p/X/D/w/AB standards which are adjustable based on different design requirements, and the embodiments of invention are not limited thereto. The indirect connection indicates that equipments, such as other network switches 150 or the routers, may be cascadely connected between the IP connected apparatus 110 and the network switch 150.

The storage unit 153 may be a fixed or a movable device in any possible forms including a random access memory (RAM), a read-only memory (ROM), a flash memory or other similar devices, or a combination of the above-mentioned devices. In the present embodiment, the storage unit 153 is configured to record software programs including a device management module 153_1, a management interface module 153_3 and a file access module 153_5, a script program configured to obtain related information of an unknown IP connected apparatus 110 or set the unknown IP connected apparatus 110, a web server program, related information of the IP connected apparatus 110, and data files in various types. Detailed description of each of the modules 153_1, 153_3 and 153_5, the script program and the web server program will be described later in the following embodiments.

The processing unit 153 is connected to the communication module 151 and the storage unit 153, and may be a central processing unit (CPU) or other programmable microprocessors for general purpose or special purpose, Digital Signal Processor (DSP), a programmable controller, Application Specific Integrated Circuit (ASIC) or other similar elements or a combination of above-mentioned elements. In the present embodiment of the invention, the processing unit 155 is configured to perform all tasks of the network switch 150, and is capable of accessing and executing the modules recorded in the storage unit 153.

Figure 3:
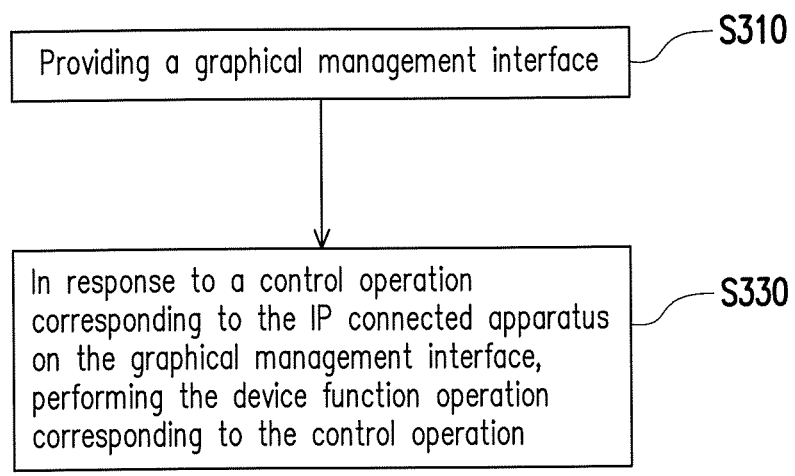
FIG. 3 is a flowchart illustrating a device management method according to an embodiment of the invention.

To facilitate in understanding more of operating procedures in the embodiments of the invention, various embodiments are provided below and served to further describe a device management method of the device management system 100 in the embodiments of the invention. FIG. 3 is a flowchart illustrating a device management method according to an embodiment of the invention. Referring to FIG. 3, the method of the present embodiment is adapted to the IP connected apparatuses 110 and the network switch 150 in FIG. 1. Hereinafter, the method according to the embodiments of the invention is described below by reference with various elements in the IP connected apparatuses 110 and the network switch 150. Each step in the device management method may be adjusted based on actual conditions, and the invention is not limited thereto.

In step S310, the management interface module 153_3 of the network switch 150 provides a graphical management interface. Specifically, the management interface module 153_3 is, for example, a HyperText Transfer Protocol (HTTP) server (or a web server) (e.g., Apache server, Internet Information Server (IIS)) programs for providing a web page interface to other electronic apparatuses (e.g., a desktop computer, a notebook computer, etc.) or the IP connected apparatuses 110, which are connected to the network switch 150 through the connection ports 151_1 to 151_N, RS-232 serial port or Universal Serial Bus (USB) transmission interfaces or via the Internet. The IP connected apparatuses 110 or the electronic apparatuses can execute a web browser (or related programs based on HTTP protocol, Telnet or Universal Plug and Play (UPnP) protocol) and enter a specific network address (e.g., an IP address, a port number, etc.) in order to load in the graphical management interface.

A dimension or a layout configuration of the graphical management interface may also be dynamically changed according to a specification or a dimension adjustment task (e.g., adjustment on the graphical management interface performed by a user and detected by management interface module 153_3) of a display unit of aforesaid IP connected apparatus. For example, the graphical management interface may be in form of a cell phone interface, a tablet interface, a computer interface and so on.

It should be noted that, the management interface 153_3 may also activate other graphical user interfaces (GUI) programs for the IP connected apparatus 110 or the other electronic apparatuses to load in the graphical user interface. Further, the management interface module 153_3 of the present embodiment of the invention is embedded in the network switch 150. In other words, the network switch 150 can directly provide the graphical management interface without additionally installing programs. Accordingly, for the general public, the complex program installation step may be eliminated. On the other hand, the management interface module 153_3 also provide the CLI and the Web UI so that the setting method can be more flexible for operating personnels.

In an embodiment, a device function operation provided by the device management module 153_1 includes an information collecting operation. The device management module 153_1 can perform the information collecting operation on the IP connected apparatus 110 through the communication module 151 to obtain the related information of the IP connected apparatus 110. The management interface module 153_3 can present the related information of the IP connected apparatus 110 through the graphical management interface.

Specifically, based on communication protocols corresponding to the IP connected apparatus 110 (e.g., Address Resolution Protocol (ARP), UPnP, Link Layer discovery protocol (LLDP), Open Network Video Interface Forum (ONVIF), Network Basic Input/Output System (NetBIOS), Simple Network Management Protocol (SNMP), etc.), the device management module 153_1 can communicate with the IP connected apparatuses 110 or the other network switches 150 through the communication module 151 via the corresponding connection ports 151_1 to 151_N, and scan the IP connected apparatuses 110 or the other network switches 150 on all the links related to the network switch 150, so as to obtain the related information of said apparatuses including device information (e.g., a device name, a model number, a code number, a device type, Power over Ethernet (PoE) information, etc.), coupling information (e.g., the port number, etc.), a network configuration (e.g., Virtual Local Area Network (VLAN), the IP address or a Media Access Control (MAC) address, etc.).

It should be noted that, the device management module 153_1 may perform the information collecting operation periodically (e.g., per minute, per hour, etc.) or according to a specific event (e.g., when the IP connected apparatus 110 on the link is abnormal, etc.). Further, according to different design requirements, persons applying the embodiments of the invention can change a type of the communication protocol being used or the related information of the IP connected apparatus 110 to be obtained.

In an embodiment, the graphical management interface provides one of a topology mode, a floor mode and a map mode or a combination thereof. In response to a control operation (e.g., any operation on the user interface such as click, select, drag, double-click, information input, etc.) on the graphical management interface, the management interface module 153_3 presents the related information of the IP connected apparatus 110 through one of said modes. Mode options from, for example, one of the topology mode, the floor mode and the map mode or the combination thereof are provided on the graphical management interface. The management interface module 153_3 can detect the corresponding control operation on the mode options, so as to present the selected mode on the graphical management interface.

Figure 4A:
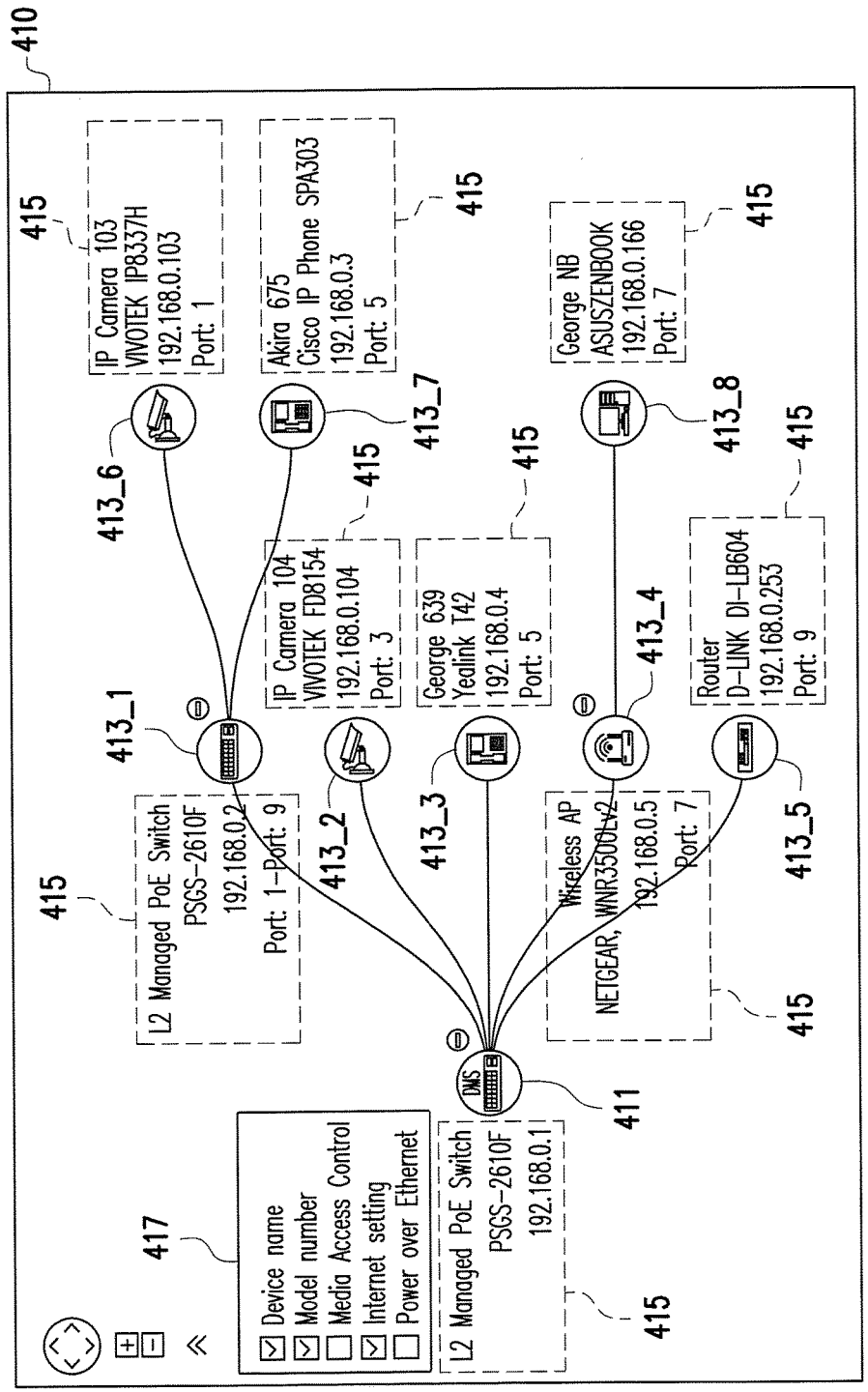
FIG. 4A is an example of the topology mode.

For instance, FIG. 4A is an example of the topology mode. Referring to FIG. 4A, since the topology mode is selected in response to the control operation, a topological diagram with the network switch 150 as a master terminal may be established by the management interface module 153_3 based on the related information of the IP connected apparatuses 110 obtained by using the information collecting operation, and presented as a topological diagram page 410. The network switch 150 may be presented by an icon 411, and the IP connected apparatuses 110 may be presented by icons 413_1 to 413_8, respectively. Patterns of the icon 411 and the icons 413_1 to 413_8 may be determined according to the device information. The management interface module 153_3 can detect the control operation (e.g., a click operation) on the icon 411 and the icons 413_1 to 413_8, so as to further provide a device function option corresponding to the selected icon. Related information 415 (e.g., the device name, the model number, the IP address, the connection port, etc.) of the network switch 150 and the IP connected apparatuses 110 may also be presented on the topological diagram page 410. Further, in response to the control operation (e.g., a check operation) of an information disclosure option 417, the management interface module 153_3 can present the desired information in the related information 415 of the network switch 150 and the IP connected apparatuses 110 based on the selection on the information disclosure option 417. Accordingly, a coupling relation and a deploying relation of all the IP connected apparatuses 110 and the network switch 150 may be clearly learned from the topological diagram to facilitate the network administrators to further set and control the IP connected apparatuses 110 and the network switch 150.

Figure 4B:
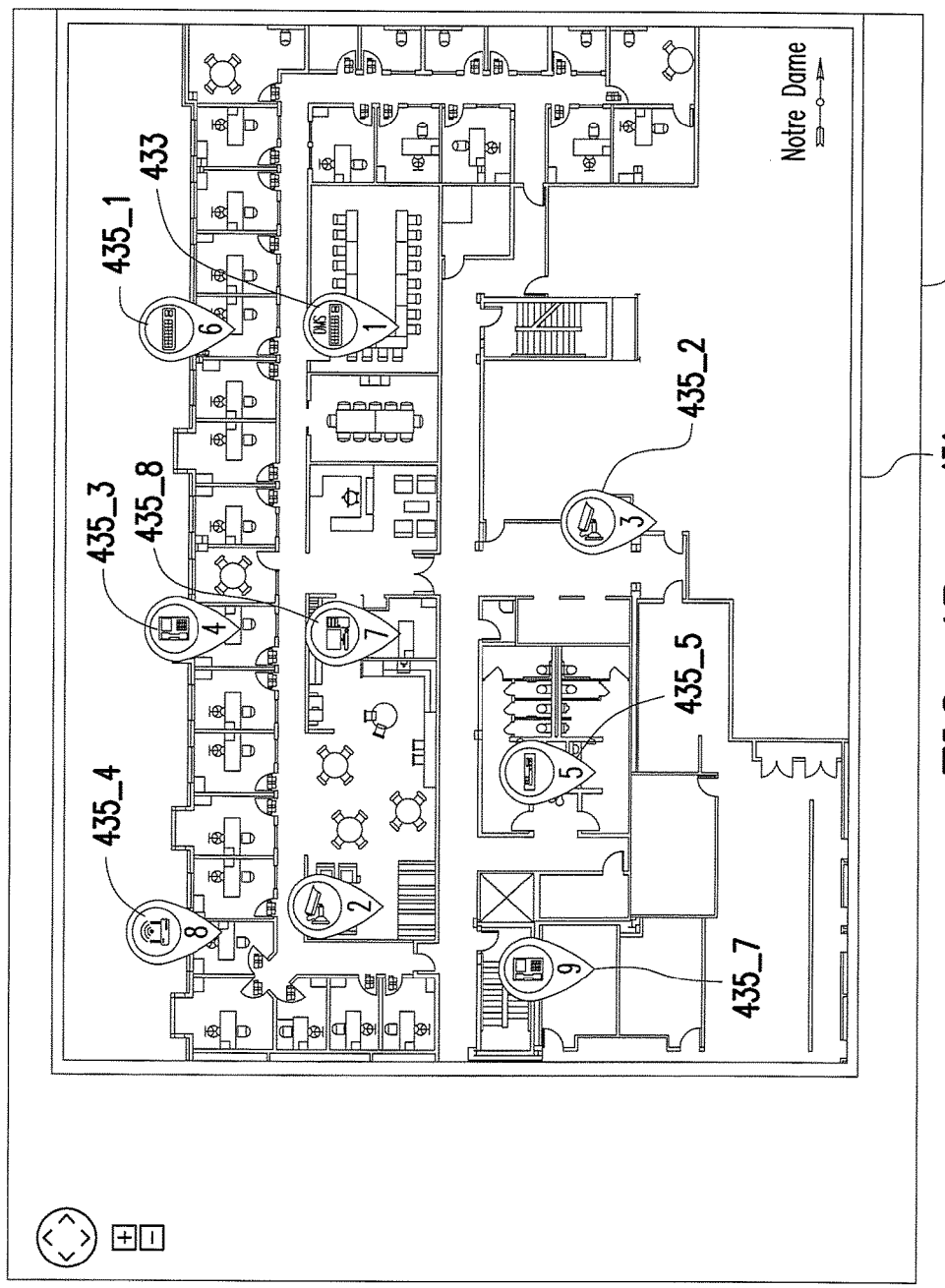
FIG. 4B is an example of the floor mode.

FIG. 4B is an example of the floor mode. Referring to FIG. 4B, since the floor mode is selected in response to the control operation, a floor page 430 may be established by the management interface module 153_3 based on the related information of the IP connected apparatuses 110 obtained by using the information collecting operation. The management interface module 153_3 can first provide a floor plan 431, and receive the control operation of the user on the floor page 430 (e.g., setting locations of the network switch 150 and the IP connected apparatuses 110 on the floor plan 431). Next, icons 433 and 435_1 to 435_8 respectively corresponding to the network switch 150 and the IP connected apparatuses 110 may be presented on the floor page 430. Accordingly, the network administrators can instantly find the floors or the places where the apparatuses are located.

Figure 4C:
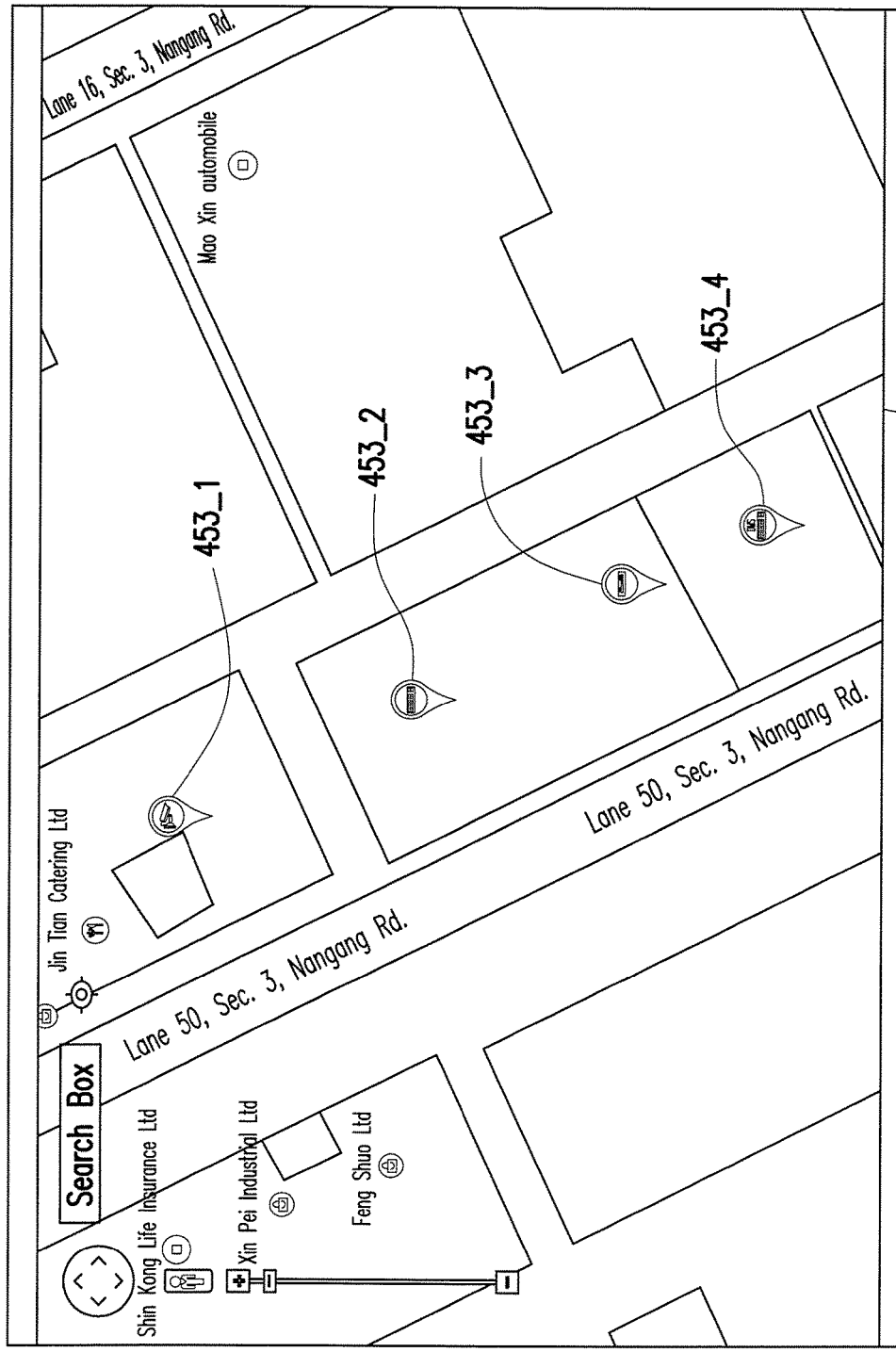
FIG. 4C is an example of the map mode.

Further, FIG. 4C is an example of the map mode. Referring to FIG. 4C, since the map mode is selected in response to the control operation, a map page 450 may be established by the management interface module 153_3 based on the related information of the IP connected apparatuses 110 obtained by using the information collecting operation. The related information includes location information of the IP connected apparatuses 110 and the network switch 150 (e.g., a Global Positioning System (GPS) location, latitude and longitude, etc.), which may be obtained by receiving the locations inputted by an input operation of the user. Alternatively, the management interface module 153_3 can receive a setting operation for the locations of the IP connected apparatuses 110 and the network switch 150 performed by the user on the map page 450. The management interface module 153_3 loads an electronic map 451 through an electronic map engine (e.g., Google map, Bing map, Here map, etc.) so that icons 453_1 to 453_4 corresponding to the IP connected apparatuses 110 and the network switch 150 may be presented on the electronic map 451. Accordingly, the network administrators can instantly find the actual locations of the IP connected apparatuses 110.

In view of the above, the management interface module 153_3 can provide the intuitive operation interfaces by presentation methods in different modes to the network administrators to facilitate management of a large amount of IP connected apparatuses 110 in various type. Further, each of the topological diagram page 410, the floor page 430 and the map page 450 may be captured as screen shots (e.g., stored as image files in JPGE, SVG, etc.) to facilitate subsequent application for the network administrators. It should be noted that, graphics, texts and locations on the topological diagram page 410, the floor page 430 and the map page 450 are only served as examples, and may be changed by persons applying the embodiments of the invention based on different design requirements.

In addition, the management interface module 153_3 also provides a search function through the graphical management interface. The management interface module 153_3 can receive an input operation of specific texts including the device name, the IP address and a floor number, so as to filter the related information of the IP connected apparatuses 110 and present a filtered result on the graphical management interface.

Figure 5:
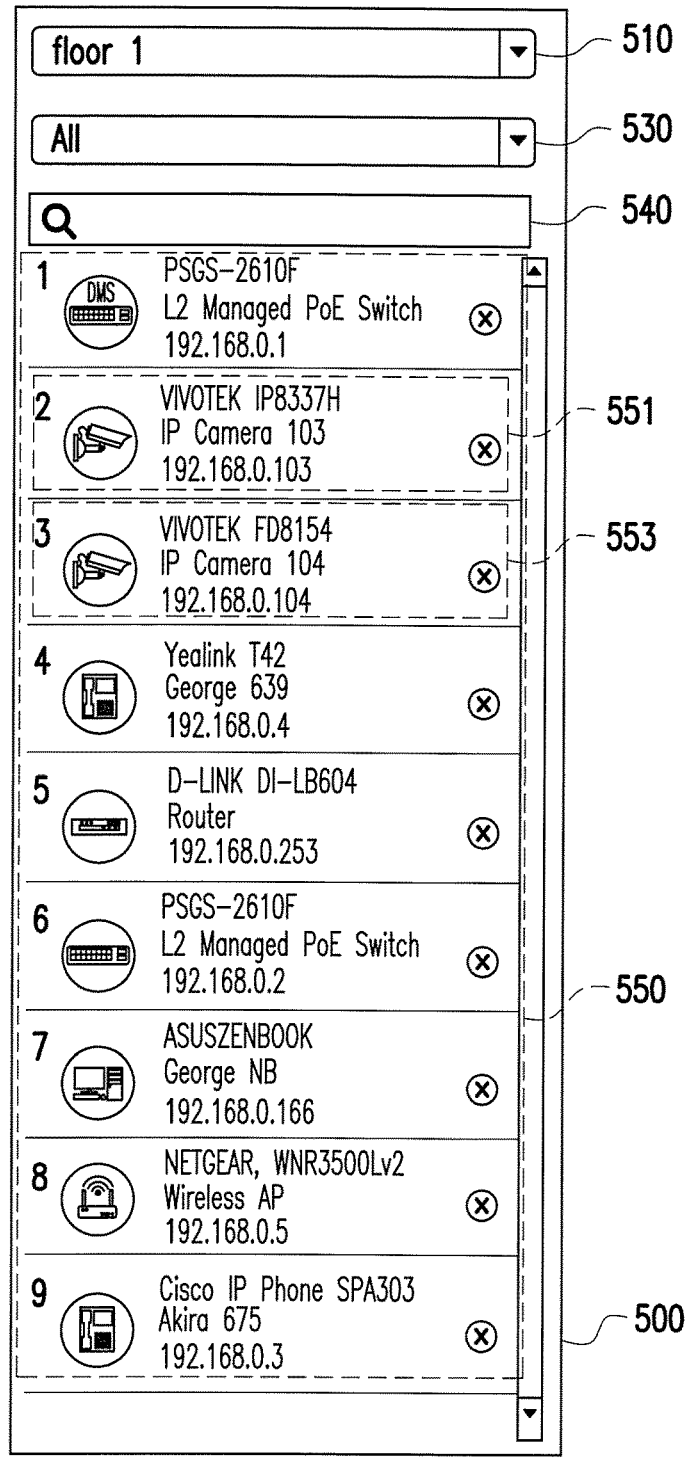
FIG. 5 is an example of a filtering program interface.

For instance, FIG. 5 is an example of a filtering program interface. Referring to FIG. 5, the management interface module 153_3 can receive selections made on a floor option 510 (for the floor page 430 shown in FIG. 4B) and a device option 530 in a filtering program interface 500, so as to present the filtered result matching the selections in a device presentation area 550. The related information of the IP connected apparatuses 110 and the network switch 150 may be presented in the device presentation area 550. Next, the management interface module 153_3 can receive an input operation of a filtering condition 540 in the filtering program interface 500 so as to further present the filtered result in the device presentation area 550. For example, when "IP Camera" is inputted in the filtering condition 540, only device information 511 and 553 corresponding to the Internet camera are presented in the device presentation area 550.

In addition to the related information of the IP connected apparatuses 110, the device management module 153_1 can further perform a traffic control for each of the IP connected apparatuses 110. The device management module 153_1 records a network speed and a traffic of unlink and downlink for each of the connection ports 151_1 to 151_N and the IP connected apparatuses 110 by different monitoring time intervals (in weeks, hours, minutes, etc.). The management interface module 153_3 can display the traffics of the different IP connected apparatuses 110 within a specific time interval (e.g., in one day, one week, etc.) by a bar chart, so that the network administrators can quickly be informed of where the problem is and accordingly prevent the occurrences of violence download and the like. Further, the device management module 153_1 can also detect connection states of all the links between the network switch 150 and each of the IP connected apparatuses 110 or related to the IP connected apparatuses 110 in real time, and the management interface module 153_3 can quickly present the connection states on the graphical management interface (e.g., present abnormal links by using specific icons, line sections, text, images, etc.), so that the network administrators can quickly find the problems.

In aforesaid information collecting operation, since the device management module 153_1 already knows the communication protocols or the setting methods corresponding to the IP connected apparatuses 110, the desire related information may be obtained accordingly. In other words, with regard to the unknown IP connected apparatus 110 or another unknown network switch, it is possible that the device management module 153_1 does not know which of the communication protocols or the setting methods must be adopted in order to obtain the related information of the unknown IP connected apparatus 110. The information collecting operation for the unknown IP connected apparatus 110 is further described as follows.

In an embodiment, the related information of the IP connected apparatus 110 includes a network address information (e.g., the MAC address, the IP address, etc.). The device management module 153_1 executes a script program based on the network address information, and performs the information collecting operation through the script program. Specifically, the device management module 153_1 can send, for example, an ARP request through the communication module 151, so as to learn the MAC address of the unknown IP connected apparatus 110 and search the corresponding script in the storage unit 153 based on the MAC address. For example, the device management module 153_1 can learn a device brand name based on the MAC address (e.g., first three codes of the MAC address represent the device brand name), and search the script program corresponding to the device brand name. The script program can obtain specific files, data or information from the unknown IP connected apparatus 110, so that the device management module 153_1 can further analyze the specific files, data or information in order to obtain the related information of the unknown IP connected apparatus 110. Accordingly, the unknown IP connected apparatus 110 or the another unknown network switch may be included in the topological diagram of the network switch 150.

Next, in step S330, in response to a control operation corresponding to the IP connected apparatus 110 on the graphical management interface, the device management module 153_1 performs the device function operation corresponding to the control operation through the communication module 151. In other words, during actual operation, the user can directly perform the control operation on the icons or the texts corresponding to the IP connected apparatuses 110 on the graphical management interface, so as to perform the device function operation. In the present embodiment, the device management module 153_1 generates a control signal corresponding to the control operation based on the network protocol, and transmits the control signal through the corresponding connection port 151_1 to 151_N in the communication module 151 to perform the device function operation.

Specifically, the device management module 153_1 can provide multiple device management operations for the different IP connected apparatuses 110. Because the device management module 153_1 performs the device function operation on the IP connected apparatus 110 through the communication module 151, the device management module 153_1 must communicate with the IP connected apparatus 110 through the device function operation and the network protocol supported by the IP connected apparatus 110 or a specific setting method, and generate the corresponding control signal accordingly. The IP connected apparatus 110 may then accept the device function operation of the network switch 150 in response to the control signal.

In an embodiment, the device function operation includes a configuration setting operation. The device management module 153_1 performs the configuration setting operation on the IP connected apparatus 110 through the communication module 151, so as to set the IP connected apparatus 110 corresponding to the control operation. The configuration setting operation may be used in any type of network configuration, such as VLAN, IP, Secure Shell (SSH), Remote Authentication Dial In User Service (RADIUS), Dynamic Host Configuration Protocol (DHCP), Simple Network Time Protocol (SNTP), but the embodiments of the invention is not limited to the above. For the unknown IP connected apparatus 110, the device management module 153_1 can also perform the configuration setting operation through aforesaid script program by a specific negotiation program.

The management interface module 153_3 detects the control operation for the IP connected apparatuses 110 and the network switch 150 on the graphical management interface. For example, click operations on the icons 411, 413_1 to 413_8 in FIG. 4A may be detected. The management interface module 153_3 can provide the corresponding device function option for the selected IP connected apparatuses 110 and the network switch 150. In other words, different device function options may be provided for different types of the IP connected apparatuses 110.

Figure 6A:
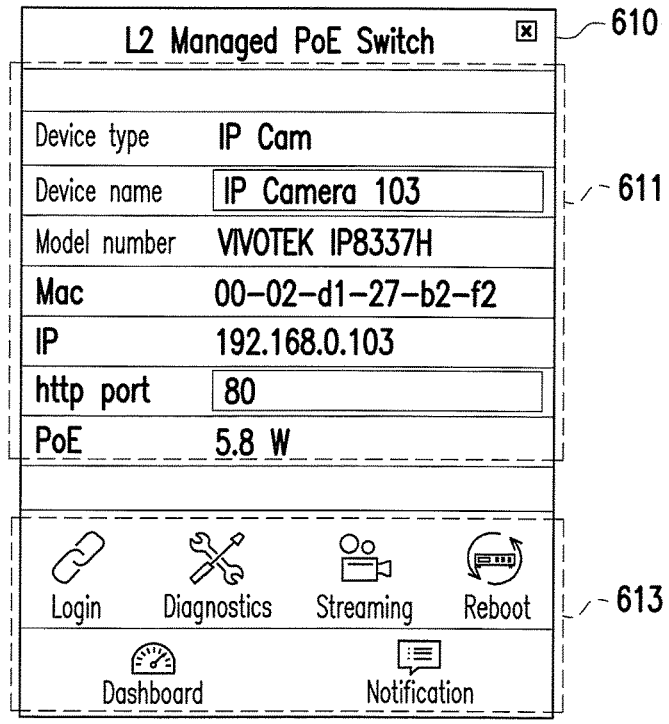
FIG. 6A is an example of the device function option.

For instance, FIG. 6A is an example of the device function option. Referring to FIG. 4A and FIG. 6A together, in response to the click operation on the icon 413_2 in FIG. 4A, the management interface module 153_3 presents a device function page 610 corresponding to the IP camera. The device function page 610 can present related information 611 of the IP camera including "Device type", "Device name", "Model number", "MAC Address", "IP Address", "http port" and "PoE Information", and can also present device function options 613 including "Login", "Diagnostics", "Streaming", "Reboot", "Dashboard" and "Notification".

Figure 6B:
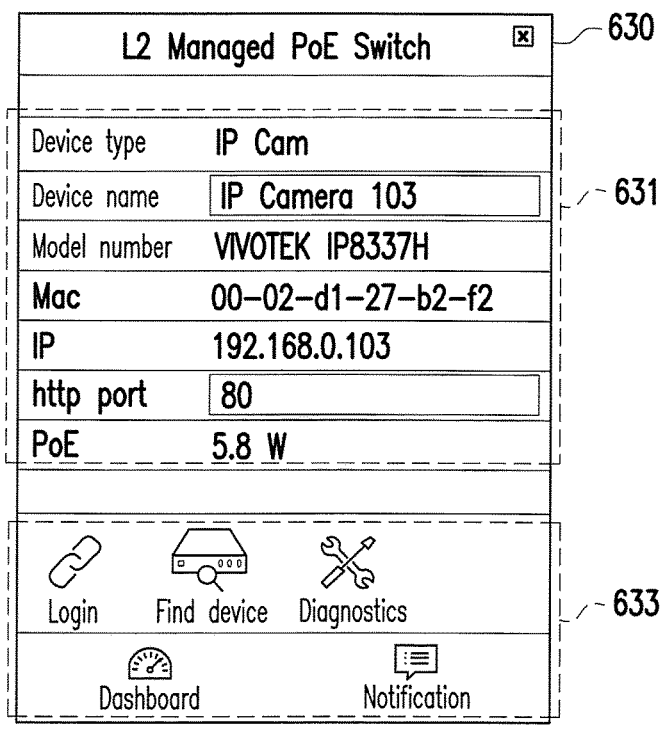
FIG. 6B is another example of the device function option.

FIG. 6B is another example of the device function option. Referring to FIG. 4A and FIG. 6B together, in response to the click operation on the icon 413_1 in FIG. 4A, the management interface module 153_3 presents a device function page 630 corresponding to another network switch 150. The device function page 630 can present related information 631 of the another network switch 150 including "Device type", "Device name", "Model number", "MAC Address", "IP Address" and "PoE Information", and can also present device function options 633 including "Login", "Find Device", "Diagnostics", "Dashboard" and "Notification". The corresponding device function operations in the device function options 613 and 633 are described in more detail with reference to various embodiments below.

In an embodiment, the device function operation includes a node searching operation. The device management module 153_1 generates the control signal including a warning control instruction based on the IP connected apparatus 110 corresponding to control operation. The warning control instruction is configured to control the IP connected apparatus 110 or another network switch 150 to perform a warning behavior (e.g., flashing light, making sounds, etc.). For instance, in response to the click operation on "Find Device" in the device function options 633 in FIG. 6B, the device management module 153_1 generates the warning control instruction configured to control a lighting module (e.g., having at least one Light Emitting Diode (LED)) on the IP connected apparatus 110, and transmits the control signal including the warning control instruction to the IP connected apparatus 110. When the IP connected apparatus 110 receives the warning control instruction, the lighting module thereof can start flashing light according to the warning control instruction. In addition, the device management module 153_1 may also perform identical or similar node searching operation on another network switch 150, so that said another network switch 150 can perform the warning behavior.

It should be noted that, the IP connected apparatus 110 or the another network switch 150 may also include one of a display module (e.g., Liquid Crystal Display (LCD), Organic Electro-Luminescent Display (OELD), etc.), a vibration module (e.g., a module that includes a vibration motor) or a speaker module (e.g., mono or stereo speakers), or a combination thereof, and the corresponding warning behavior may include: displaying texts, images or graphics to explain warning arrangements, generating vibrations in fixed frequency or variable frequency or making a prompt sound. Based on different design requirements, persons applying the embodiments of the invention may design any type of the warning module and the warning behavior for the IP connected apparatuses 110. Accordingly, for environments where a large amount of the IP connected apparatuses 110 and the network switch 150 is deployed, the user can quickly find the IP connected apparatus 110 by observing the warning behavior.

In another embodiment, the device function operation includes a system login operation. The device management module 153_1 performs the system login operation to log in the IP connected apparatus 110 through the communication module 151 and performs a proxy operation on a management system of the IP connected apparatus 110. For instance, in response to the click operation on "Login" in the device function option 633 in FIG. 6B, the device management module 153_1 generates the control signal including login information (e.g., account, password, etc.) and other login-related setting information of such IP connected apparatus 110, and transmits the control signal to such IP connected apparatus 110.

After the IP connected apparatus 110 is logged in, if the IP connected apparatus 110 is another network switch 150, the management interface module 153_3 loads a graphical management interface of said another network switch 150 and establishes a topological diagram with said another network switch 150 as the master terminal, so as to achieve the purpose of proxy operation. Further, aforesaid operations including different presentation modes, the node searching operation, the information collecting operation and the system login operation may also be controlled by using the graphical management interface of the another network switch 150 in a manner of using the another network switch 150 as the master terminal. If the IP connected apparatus 110 is not the another network switch 150, the management interface module 153_3 loads a management system owned by such IP connected apparatus 110. In other words, the user may directly operate the management system of the another IP connected apparatus 110 on the network switch 150 without connecting a connection line to said another IP connected apparatus 110.

In an application scenario where failures occurred on some network switches 150 with embedded management interface module 153_3, the system login operation can be performed on the functioning network switches 150, so as to obtain the topological diagram corresponding to the functioning network switches 150 and perform management tasks on these logged-in network switches 150.

In yet another embodiment, the device function operation includes a troubleshooting operation. For instance, in response to the click operation on "diagnostics" in the device function option 613 in FIG. 6A, the device management module 153_1 monitors state (e.g., infatuation regarding whether connection is interrupted, or the traffic is excessively large) of all the links corresponding to the IP connected apparatus 110 (communication paths for directly or indirectly connecting to the IP connected apparatus 110) through the communication module 151, and the management interface module 153_3 presents the links, all the IP connected apparatuses 110 on the links, and corresponding link states through the graphical management interface. For example, the graphical management interface can present a specific text, color or pattern for indicating an abnormal state.

In yet another embodiment, the device function operation includes a multimedia streaming operation. For instance, in response to the click operation on "Streaming" in the device function option 613 in FIG. 6A, the device management module 153_1 transmits the control signal including multimedia streaming-related information corresponding to the IP connected apparatus 110 (e.g., the IP camera) through the communication module 151. Next, the management interface module 153_3 can then present a current capturing image of the IP camera on the graphical management interface. In other examples, multimedia streams with only the sound or a combination of video and sound may both be played on the graphical management interface through the multimedia streaming operation according to the embodiments of the invention.

In another embodiment, the device function operation includes a power management operation. For instance, in response to the click operation on "Reboot" in the device function option 613 in FIG. 6A, the device management module 153_1 transmits the control signal including a PoE protocol corresponding to the IP connected apparatus 110 through the communication module 151. Next, the IP connected apparatus 110 reboots in response to said control signal. Furthermore, other power managements including shut down, sleep, wakeup may all be implemented in the embodiments of the invention. On the other hand, the device management module 153_1 may further obtain PoE related information (e.g., power supply, power consumption, etc.) of the IP connected apparatus 110 through the communication module 151.

It should be noted that, "Dashboard" and "Notification" in the device function option can provide a performance (e.g., speed, traffic, etc.) monitoring chart and a specific event (e.g., shut down, over-large traffic, abnormal connection, abnormal power supply, network attack, etc.) notification respectively. In addition, based on different design requirements, persons applying the embodiments of the invention may change the device function operation and content of the control signal.

On the other hand, in an embodiment, the file access module 153_5 can allow the IP connected apparatus 110 to access files in the storage unit 153 through the communication module 151. Specifically, in addition to allowing the IP connected apparatus 110 to access the existing files in the storage unit 153, the file access module 153_5 can also store the files into the storage unit 153 of the network switch 150 through a file access behavior on the graphical management interface. For example, the screen shot file of the topological diagram 410 in FIG. 4A may be stored in the storage unit 153. In other words, the network switch 150 served as the master terminal can share the files in the storage unit 153 to the IP connected apparatuses 110 or other network switches. When another network switch 150 changes from a slave terminal to the master terminal (e.g., the management system thereof is logged in), the files in the storage unit 153 of the another network switch 150 may also be shared to the IP connected apparatuses 110 and the network switch 150.

In summary, the network switch, the device management system and the device management method thereof according to the embodiments of the invention are capable of providing the intuitive operation through visual interfaces by the network management system (NMS) and the device management system (DMS) including the graphical management interface embedded in the network switch, so that the network administrators can perform the management more conveniently. The graphical management interface also provides the topology mode, the floor mode and the map mode, so as to reduce the difficulty in deploying and planning the large amount of the IP connected apparatuses. Further, the corresponding device management option may be provided for different IP connected apparatuses. In addition to the network configuration, various device management operations (e.g., "Find Device", "Login", "Troubleshooting", etc.) may all be controlled on the graphical management interface for each of the IP connected apparatuses. On the other hand, resources in the network switch may also be shared according to embodiments of the invention. As a result, with effectiveness including fast detection, simple operation and massive management provided according to the embodiments of the invention, the innovative and convenient device management may be provided for the network administrators.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A network switch, comprising:
   a communication module, transmitting and receiving signals;
   a storage unit, storing a plurality of modules; and
   a processing unit, coupled to the communication module and the storage unit, accessing and executing the modules stored in the storage unit, and the modules comprising:
   a device management module, performing at least one device management operation through the communication module and obtaining MAC address of at least one IP connected apparatus whose communication protocol or setting method is unknown to the network switch;
   a management interface module, providing a graphical management interface, wherein the device management module performs the at least one device function operation corresponding to a control operation in response to the control operation on the graphical management interface; and
   a file access module, sharing at least one file in the storage unit to the at least one IP connected apparatus through the communication module, wherein
   the graphical management interface is a graphical user interface (GUI);
   the device management module executes a script program based on the MAC address and performs an information collection operation or configuration setting operation on the at least one IP connected apparatus through the script program;
   the graphical management interface provides a topology mode, and the topology mode presents, in response to the control operation, desired information related to a connection port of the at least one IP connected apparatus; and
   the at least one device function operation comprises a system login operation, and the device management module performs the system login operation to log in the at least one IP connected apparatus through the communication module and loads another graphical management interface of the at least one IP connected apparatus if the at least one IP connected apparatus is another network switch.

2. The network switch of claim 1, wherein the device management module generates a control signal corresponding to the control operation based on at least one network protocol, and transmits the control signal through a corresponding connection port in the communication module to perform the at least one device function operation, wherein the control operation is corresponding to the at least one IP connected apparatus or another network switch.

3. The network switch of claim 2, wherein the at least one device function operation comprises one of the information collecting operation and the configuration setting operation or a combination thereof, wherein the device management module performs the information collecting operation or the configuration setting operation on the at least one IP connected apparatus though the communication module to obtain related information of the at least one IP connected apparatus or set the at least one IP connected apparatus corresponding to the control operation, and the management interface module presents the related information of the at least one IP connected apparatus through the graphical management interface, wherein the configuration setting operation is associated with at least one of Virtual Local Area Network (VLAN), IP, Secure Shell, Remote Authentication Dial In User Service (RADIUS), Dynamic Host Configuration Protocol (DHCP), Simple Network Time Protocol (SNTP).

4. The network switch of claim 3, wherein the graphical management interface provides one of the topology mode, a floor mode and a map mode or a combination thereof, and the management interface module presents the related information of the at least one IP connected apparatus through one of said modes in response to the control operation.

5. The network switch of claim 2, wherein the at least one device function operation comprises a node searching operation, and the device management module performs the node searching operation based on the at least one IP connected apparatus corresponding to the control operation to generate the control signal including a warning control instruction, wherein the warning control instruction is configured to control the at least one IP connected apparatus to perform a warning behavior, and the warning behavior comprises at least one of flashing light or making sound.

6. A device management method, adapted to a network switch having a communication module, wherein the network switch is directly or indirectly coupled to at least one IP connected apparatus, and the device management method comprises:
providing a graphical management interface;
obtaining MAC address of the at least one IP connected apparatus whose communication protocol or setting method is unknown to the network switch;
sharing, to the at least one IP connected apparatus, at least one file in a storage unit of the network switch;
performing at least one device function operation comprising a system login operation and corresponding to a control operation through the communication module in response to the control operation on the graphical management interface, comprising:
executing a script program based on the MAC address and performing an information collection operation or configuration setting operation on the at least one IP connected apparatus through the script program;
performing the system login operation to log in the at least one IP connected apparatus through the communication module; and
loading another graphical management interface of the at least one IP connected apparatus if the at least one IP connected apparatus is another network switch, wherein
the graphical management interface is a graphical user interface (GUI); and the graphical management interface provides a topology mode which presents, in response to the control operation, desired information related to a connection port of the at least one IP connected apparatus; and
the control operation is corresponding to the at least one IP connected apparatus or another network switch.

7. The device management method of claim 6, wherein the step of performing, the at least one device function operation comprising the system login operation and corresponding to the control operation, through the communication module, comprising:
generating a control signal corresponding to the control operation based on at least one network protocol, and transmitting the control signal through a corresponding connection port in the communication module to perform the at least one device function operation.

8. The device management method of claim 7, wherein the at least one device function operation comprises one of the information collecting operation and the configuration setting operation or a combination thereof, and the step of performing, the at least one device function operation comprising the system login operation and corresponding to the control operation, through the communication module, comprising:

performing the information collecting operation or the configuration setting operation on the at least one IP connected apparatus through the communication module to obtain related information of the at least one IP connected apparatus or set the at least one IP connected apparatus corresponding to the control operation; and
presenting the related information of the at least one IP connected apparatus through the graphical management interface, wherein the configuration setting operation is associated with at least one of Virtual Local Area Network (VLAN), IP, Secure Shell, Remote Authentication Dial In User Service (RADIUS), Dynamic Host Configuration Protocol (DHCP), Simple Network Time Protocol (SNTP).

9. The device management method of claim 8, wherein the graphical management interface provides one of the topology mode, a floor mode and a map mode or a combination thereof, and the step of performing, the at least one device function operation comprising the system login operation and corresponding to the control operation, through the communication module, comprising:
presenting the related information of the at least one IP connected apparatus through one of said modes in response to the control operation.

10. The device management method of claim 7, wherein the at least one device function operation comprises a node searching operation, and the step of performing, the at least one device function operation comprising the system login operation and corresponding to the control operation, through the communication module, comprising:
performing the node searching operation based on the at least one IP connected apparatus corresponding to the control operation to generate the control signal including a warning control instruction; and
performing a warning behavior by the at least one IP connected apparatus in response to the warning control instruction being received, wherein the warning behavior comprises at least one of flashing light or making sound.

11. A device management system, comprising:
at least one IP connected apparatus; and
at least one network switch directly or indirectly coupled to the at least one IP connected apparatus, each of the at least one network switch providing a graphical management interface, obtaining MAC address of the at least one IP connected apparatus whose communication protocol or setting method is unknown to the at least one network switch, sharing at least one file in a storage unit of the at least one network switch to the at least one IP connected apparatus, and performing at least one device function operation corresponding to a control operation in response to the control operation on the graphical management interface, wherein
the graphical management interface is a graphical user interface (GUI);
the at least one network switch executes a script program based on the MAC address and performs an information collection operation or configuration setting operation on the at least one IP connected apparatus through the script program;
the graphical management interface provides a topology mode, and the topology mode present, in response to the control operation, desired information related to a connection port of the at least one IP connected apparatus;
the at least one device function comprises a system login operation, and the at least one network switch performs system login operation to login in the at least one IP connected apparatus and loads another graphical management interface of the at least one IP connected apparatus if the at least one IP connected apparatus is another network switch; and
the control operation is corresponding to the at least one IP connected apparatus or another network switch.

\* \* \* \* \*